United States Patent
Zhu et al.

(10) Patent No.: US 9,942,807 B2
(45) Date of Patent: Apr. 10, 2018

(54) EXTEND LONG TERM EVOLUTION CONNECTED STATE COVERAGE

(71) Applicant: Verizon Patent and Licensing Inc., Arlington, VA (US)

(72) Inventors: Lily Zhu, Parsippany, NJ (US); Xin Wang, Morris Plains, NJ (US); Andrew E. Youtz, Princeton, NJ (US); Paul Venizelos, Ridgewood, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

(21) Appl. No.: 14/918,621

(22) Filed: Oct. 21, 2015

(65) Prior Publication Data
US 2017/0118680 A1   Apr. 27, 2017

(51) Int. Cl.
H04W 36/00   (2009.01)
H04W 4/00    (2009.01)
H04B 7/00    (2006.01)
H04W 36/08   (2009.01)

(52) U.S. Cl.
CPC ....... H04W 36/0055 (2013.01); H04W 36/08 (2013.01)

(58) Field of Classification Search
CPC ................. H04W 36/0055; H04W 36/08
USPC ................................................. 455/436
See application file for complete search history.

(56) References Cited

U.S. PATENT DOCUMENTS

| | | | |
|---|---|---|---|
| 2008/0268843 A1* | 10/2008 | Ore | H04W 36/0061 455/435.3 |
| 2009/0061878 A1* | 3/2009 | Fischer | G08C 17/02 455/436 |
| 2011/0124340 A1* | 5/2011 | Puttonen | H04W 36/0083 455/437 |
| 2011/0207485 A1* | 8/2011 | Dimou | H04W 36/0055 455/507 |
| 2011/0286321 A1* | 11/2011 | Sureshchandran | H04W 76/028 370/216 |
| 2013/0090115 A1* | 4/2013 | Deivasigamani | H04W 48/20 455/434 |
| 2014/0148174 A1* | 5/2014 | Teyeb | H04W 36/0083 455/441 |
| 2014/0179320 A1* | 6/2014 | Jang | H04W 36/30 455/436 |
| 2014/0235232 A1* | 8/2014 | Lee | H04W 24/02 455/423 |
| 2015/0049600 A1* | 2/2015 | Balasubramanian | H04W 76/028 370/216 |
| 2015/0195758 A1* | 7/2015 | Kim | H04W 24/10 370/252 |
| 2015/0358477 A1* | 12/2015 | Jeong | H04M 15/56 370/259 |

* cited by examiner

Primary Examiner — Rafael Pérez-Gutiérrez
Assistant Examiner — Mark G. Pannell

(57) ABSTRACT

A method, a device, and a non-transitory storage medium having instructions to detect a triggering event that invokes a T311 timer, while the device is in a radio resource control (RRC) connected state; and invoke an extended cell selection procedure that does not use an S criterion value as a basis to select a candidate cell to re-establish an RRC connection, based on a detection of the triggering event.

20 Claims, 10 Drawing Sheets

EXTEND LONG TERM EVOLUTION CONNECTED STATE COVERAGE

BACKGROUND

In Long Term Evolution (LTE) technology, a user equipment (UE) operates in one of two Radio Resource Control (RRC) states, namely an RRC connected state and an RRC idle state. Various Third Generation Partnership Project (3GPP) technical specifications define these states and the operations performed by the UE while in each state.

DETAILED DESCRIPTION OF PREFERRED EMBODIMENTS

Figure 1:
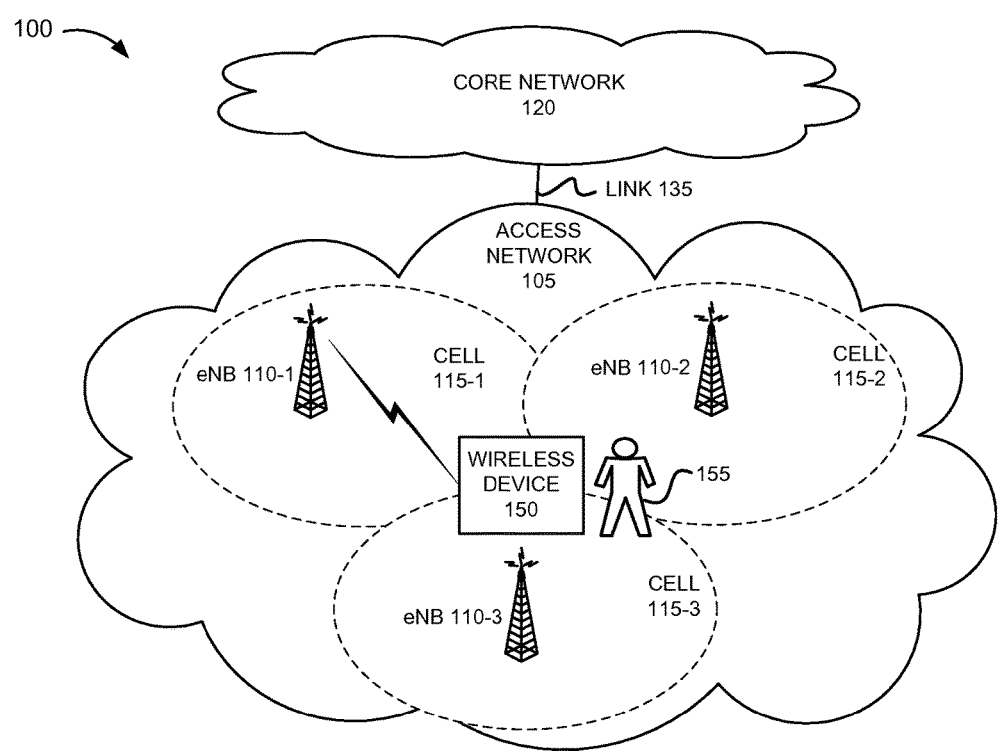
FIG. 1 is a diagram illustrating an exemplary environment in which exemplary embodiments of an extended cell selection service may be implemented.

The following detailed description refers to the accompanying drawings. The same reference numbers in different drawings may identify the same or similar elements. Also, the following detailed description does not limit the invention.

Under 3GPP specifications, the RRC idle state coverage in an LTE network is governed by signal strength and/or quality measurement. One example is a reference signal receive power (RSRP) measurement, by the UE, in relation to a reference signal transmitted by an evolved Node B (eNB). The UE can camp on a cell only if the cell selection criterion is satisfied. For example, 3GPP TS 36.304 refers to a cell selection criterion S. As set forth in version 12.5.0, the cell selection criterion S is fulfilled when:

$$Srxlev = Q_{rxlevmeas} - (Q_{rxlevmin} + Q_{rxlevminoffset}) - P_{compensation} - Qoffset_{temp}$$

Depending on the version of 3GPP TS 36.304, the equation of Srxlev may vary (e.g., $Qoffset_{temp}$ may be omitted, etc.). Nevertheless, generally speaking, the value of the parameter $Q_{rxlevmeas}$ (i.e., RSRP) at the UE must be greater than the value of the parameter $Q_{rxlevmin}$, which is set in the System Information Block Type 1 message, and an offset (e.g., $Q_{rxlevminoffset}$, etc.), which are configured.

While the UE is in the RRC connected state, the cell selection criterion S is no longer used except for when the UE transitions into one sub-state of the RRC connected state. In particular, the UE enters this sub-state upon the occurrence of various triggering events that causes the UE to start a T311 timer. The UE starts the T311 timer when the UE determines that an RRC connection is to be re-established. The UE performs various operations including a cell selection process that includes the use of the idle mode cell selection criterion S.

According to an exemplary embodiment, a UE performs an extended cell selection process while in an RRC connected state and responsive to an event that triggers a T311 timer. According to an exemplary embodiment, the extended cell selection process does not use the cell selection criterion S. According to an exemplary implementation, the UE performs the extended cell selection process only when a voice session exists (e.g., a Voice over LTE (VoLTE)). According to other exemplary implementations, the UE performs the extended cell selection process when any session (e.g., real-time session, non-real-time session) exists, or only when a real-time session exits.

According to an exemplary embodiment, during the extended cell selection process, and within the T311 timer period, the UE performs a cell search and synchronization procedure for a candidate cell (i.e., one or multiple cells). The candidate cell may include the cell on which the UE was camped. Additionally, or alternatively, the candidate cell may include a neighboring cell relative to the cell on which the UE was camped. The neighboring cell may be a cell on which the UE never camped before. According to some implementations, the selection and/or order of the candidate cells the UE searches and/or scans may be based on a list. For example, the list of candidate cells may be a most recently used (MRU) list, a public land mobile network (PLMN) list, a preferred roaming list (PRL), and so forth. The candidate cells may be on different bands and/or carrier frequencies.

During the extended cell selection process, the UE measures a reference signal transmitted by the eNB. For example, the UE may measure RSRP and/or Received Signal Strength Indicator (RSSI). The UE may calculate Reference Signal Received Quality (RSRQ) based on the RSRP and the RSSI. In the event that there are multiple candidate cells available, according to an exemplary implementation, the UE compares the measured and/or calculated values amongst each other to select the candidate cell with the highest value. However, the UE does not use the measured reference signal value (e.g., an RSRP value) to calculate the S criterion value. The UE receives and reads Master Information Block and System Information Block messages from a selected candidate cell. Thereafter, the UE performs a random access procedure (RAP) and an RRC connection re-establishment procedure to re-establish a radio resource connection with the eNB of the selected, candidate cell.

In view of the foregoing, the extended cell selection service may extend the LTE connected state coverage, by virtue of not applying the cell selection criterion S, when the T311 timer is triggered. In this regard, a cell may be a candidate cell and perhaps a selected candidate cell even though the cell may not satisfy the cell selection criterion S of the RRC idle mode. Additionally, quality of service of an existing session may be improved by expanding the pool of candidate cells from which to select and potentially allow the UE to re-establish an RRC connection more quickly.

FIG. 1 is a diagram illustrating an exemplary environment 100 in which exemplary embodiments of an extended cell selection service may be implemented. As illustrated, environment 100 includes an access network 105 and a core network 120. Environment 100 further includes a wireless device 150 and a user 155. Communicative links exist between a network element (e.g., eNB 110-1) and wireless device 150 and between network elements of access network 105 and network elements (not illustrated) of core network 120. Although one link is referenced in FIG. 1 as a link 135, there are multiple links 135 that exist in accordance with an LTE network or an LTE-Advanced (LTE-A) network architecture.

Environment 100 may include an additional network and/or arrangement of networks that is different from that illustrated in FIG. 1. For example, environment 100 may include the Internet, an Internet Protocol Multimedia Subsystem (IMS) network, and so forth. A communicative connection between devices via link 135 may be direct or indirect and may involve an intermediary device and/or an intermediary network not illustrated in FIG. 1. For example, the communicative connection between wireless device 150 and eNB 110 may be indirect and involve other types of wireless nodes, such as a home eNB, a pico base station, a femto device, a relay station, etc. Additionally, the number and the arrangement of the links are exemplary.

Access network 105 includes an Evolved UMTS Terrestrial Radio Access Network (E-UTRAN) of an LTE network or an LTE-A network. For example, access network 105 includes eNBs 110-1, 110-2, and 110-3 (also referred to collectively as eNBs 110 and, generically or individually as eNB 110). As illustrated, eNB 110-1 services a cell 115-1, eNB 110-2 services a cell 115-2, and eNB 115-3 services a cell 115-3. Cells 115-1, 115-2, and 115-3 may also be referred to collectively as cells 115 and, generically or individually as cell 115. Cell 115 indicates a geographic area serviced by eNB 110. The number of eNBs 110 and cells 115 illustrated are exemplary. Additionally, according to other implementations, a single eNB 110 may service more than one cell 115. For example, cell 115 may be defined based on the radio frequency. In this regard, eNB 110 may be provisioned with multiple and different radio frequencies and correspondingly service multiple and different cells 115.

Core network 120 includes a complementary network pertaining to access network 105, as described above, such as the core part of the LTE network or the LTE-A network. For example, although not illustrated, core network 120 includes a mobility management entity (MME), a serving gateway (SGW), a packet data network gateway (PGW), and so forth. Depending on the implementation, core network 120 may also include other network elements pertaining to various network-related aspects, such as billing, security, authentication and authorization, network polices, subscriber profiles, etc.

Wireless device 150 includes a communicative and computational device. According to an exemplary embodiment, wireless device 150 operates according to a 3GPP LTE or LTE-A standard. According to an exemplary embodiment, wireless device 150 operates according an exemplary embodiment of the extended cell selection service, as described herein.

Wireless device 150 may be implemented as a mobile device or a portable device. By way of example, wireless device 150 may be implemented as a smartphone, a tablet, a phablet, a netbook, a computer (e.g., a laptop, a palmtop, etc.), a personal digital assistant, a vehicular communication system within a vehicle, or a wearable device (e.g., a watch, glasses, armband, etc.). Wireless device 150 may store one or multiple applications. For example, wireless device 150 may include a telephone application, a multi-media application, an e-mail application, a contacts application, a calendar application, an instant messaging application, a web browsing application, a location-based application (e.g., a Global Positioning System (GPS)-based application, etc.), a social networking application, a camera application, a toolbar application, and so forth. Wireless device 150 may include various communication interfaces, such as WiFi, Bluetooth, LTE, and so forth, which allows wireless device 150 to connect to various devices, networks, etc.

Figure 2A:
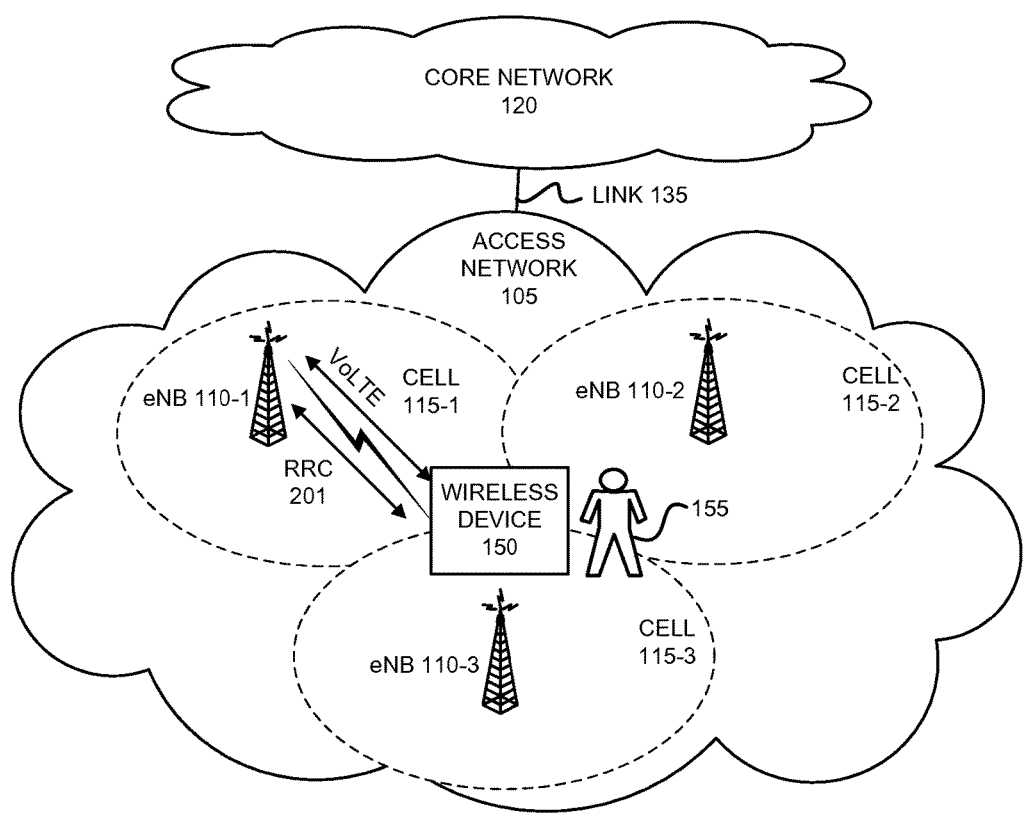
FIGS. 2A-2F are diagrams that illustrate exemplary processes pertaining to the extended cell selection service.

FIGS. 2A-2F are diagrams illustrating an exemplary implementation of an exemplary embodiment of the extended cell selection service. Referring to FIG. 2A, assume wireless device 150 is camped on cell 115-1 and is in an RRC connected state. As illustrated, an RRC 201 exists between wireless device 150 and eNB 110-1. Additionally, assume that user 155 is on a voice call (e.g., a VoLTE call). However, according to other exemplary scenarios, user 155 may not be involved in a session or may be involved in a session other than a voice call.

Figure 2B:
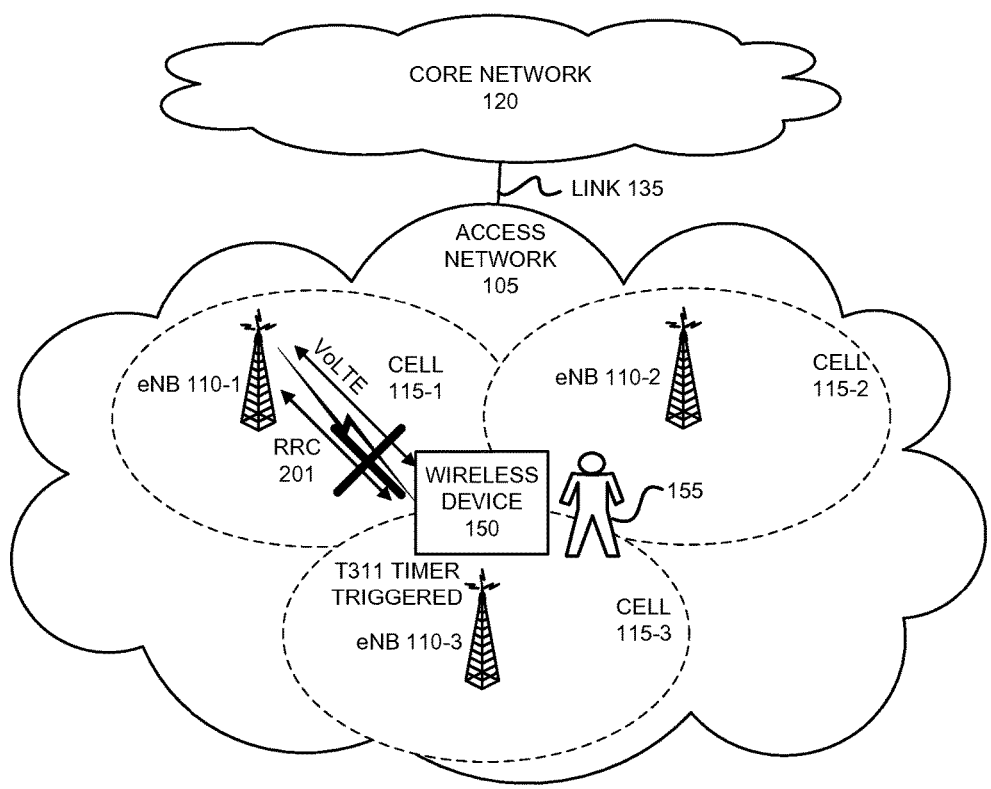

Referring to FIG. 2B, a triggering event occurs that invokes an extended cell selection process and consequently causes a T311 timer to be triggered. For example, according to this exemplary scenario, wireless device 150 invokes the extended cell selection process and triggers the T311 timer in response to a detection of a radio link failure. However, according to other exemplary scenarios, wireless device 150 may trigger the T311 timer in response to other triggering events, such as upon a handover failure, upon an RRC connection reconfiguration failure, upon physical layer problems (e.g., wireless device 150 receives N310 consecutive out-of-sync indications from lower layers) and a T310 timer expires, or upon a mobility from EURTA command failure and a T304 timer expires. Still further, according to an exemplary implementation, wireless device 150 may trigger the T311 timer in response to a triggering event that may be proprietary in nature (e.g., configured by a network operator or a service provider).

Figure 2C:
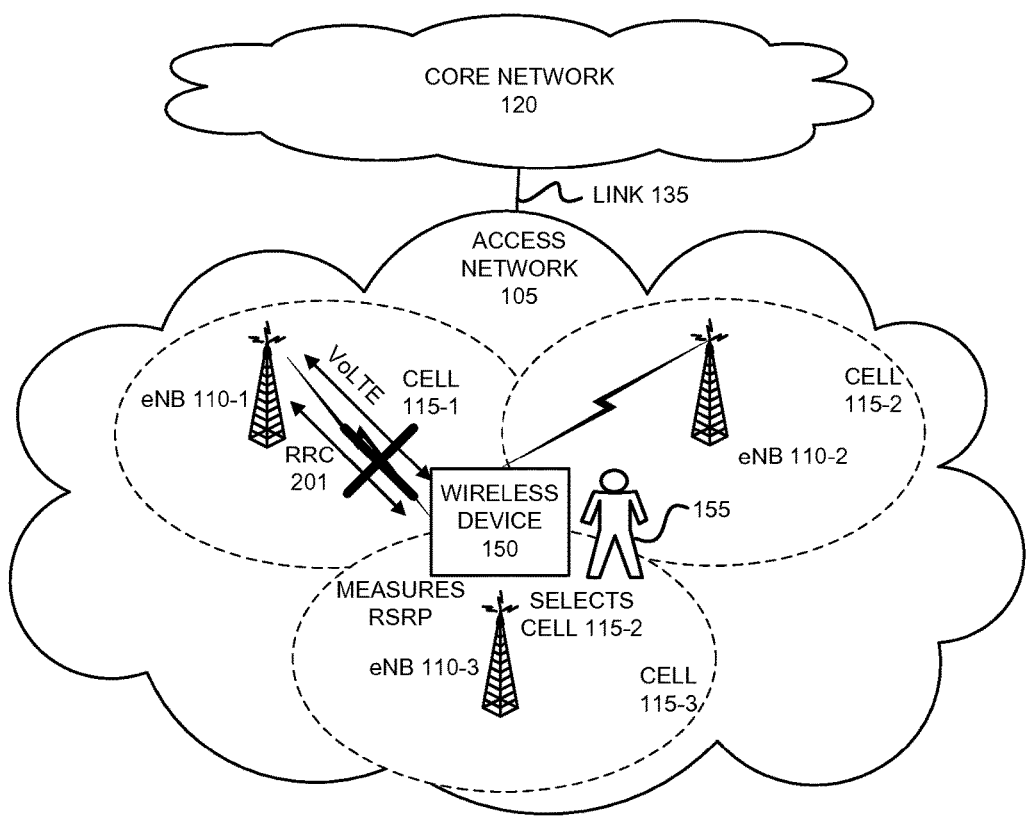

Referring to FIG. 2C, wireless device 150 begins searching and measuring a receipt of a reference signal from one or multiple eNBs 110 associated with candidate cells 115. During this process, wireless device 150 also receives synchronization signals (e.g., a primary synchronization signal (PSS) and a secondary synchronization signal (SSS)) from one or multiple eNBs 110. According to this exemplary scenario, assume wireless device 150 measures the RSRP pertaining to eNB 110-1, eNB 110-2, and eNB 110-3. Wireless device 150 compares the RSRP values amongst each other. Wireless device 150 determines that the RSRP value pertaining to eNB 110-2 is the highest value. Consequently, wireless device 150 selects eNB 110-2 and cell 115-2 as the candidate cell on which to camp and re-establish an RRC connection.

Figure 2D:
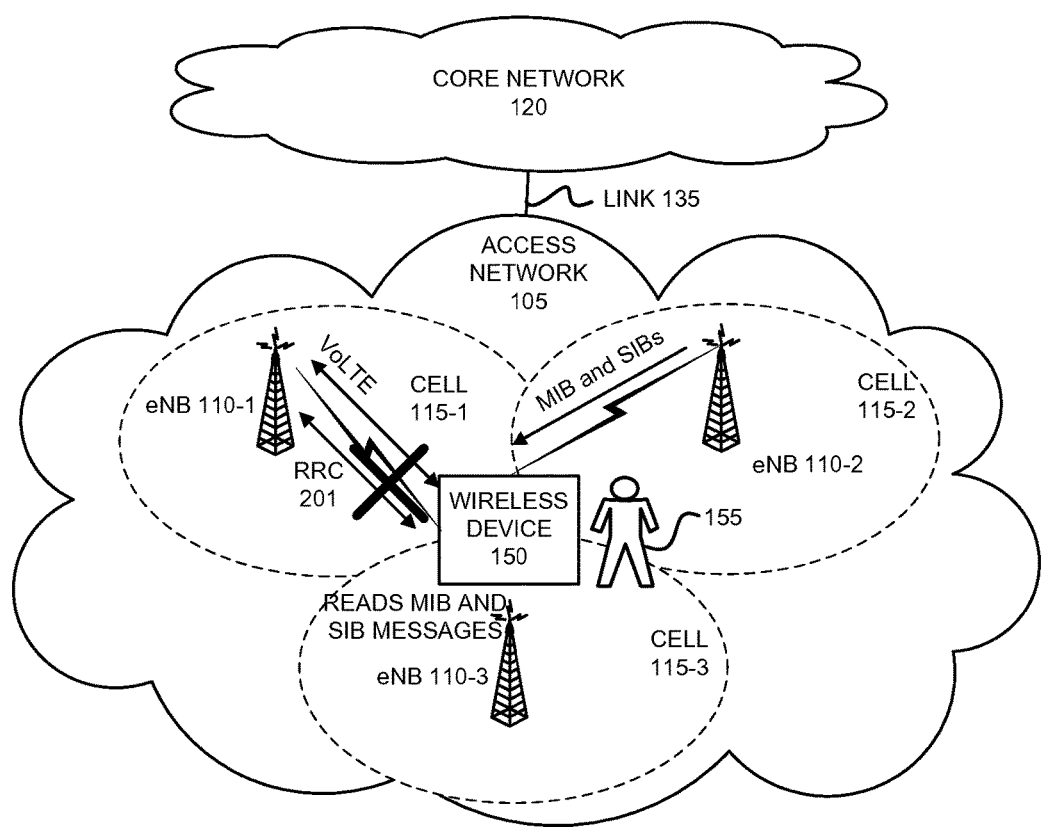
Figure 2E:
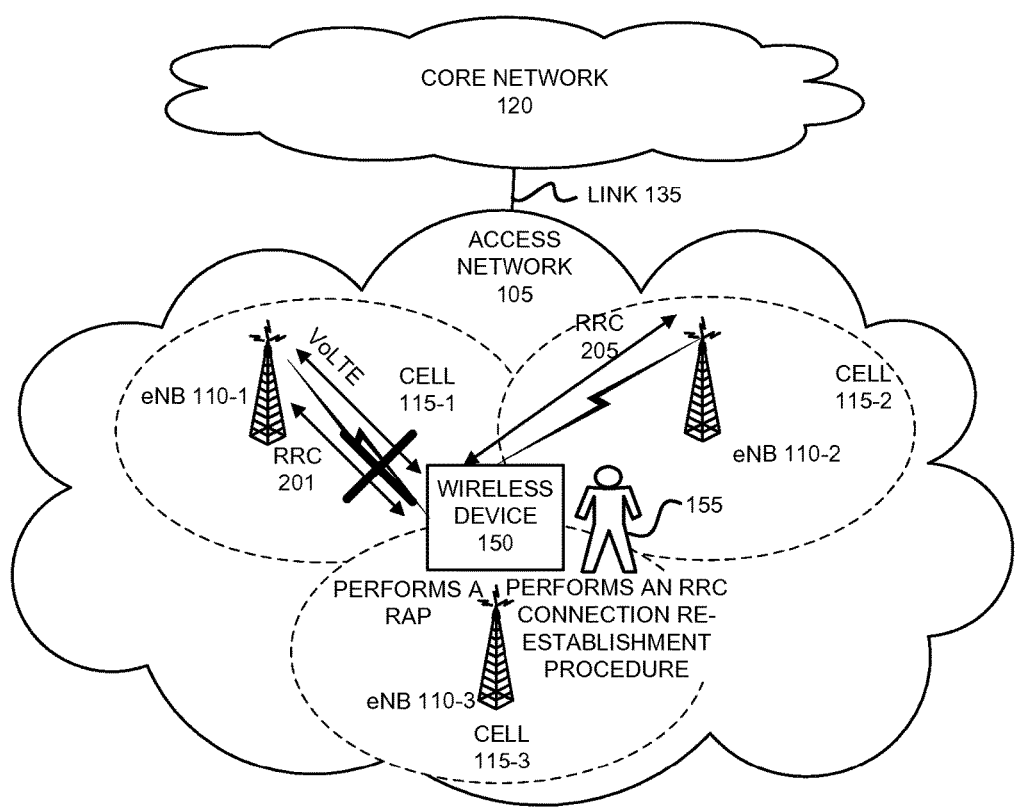
Figure 2F:
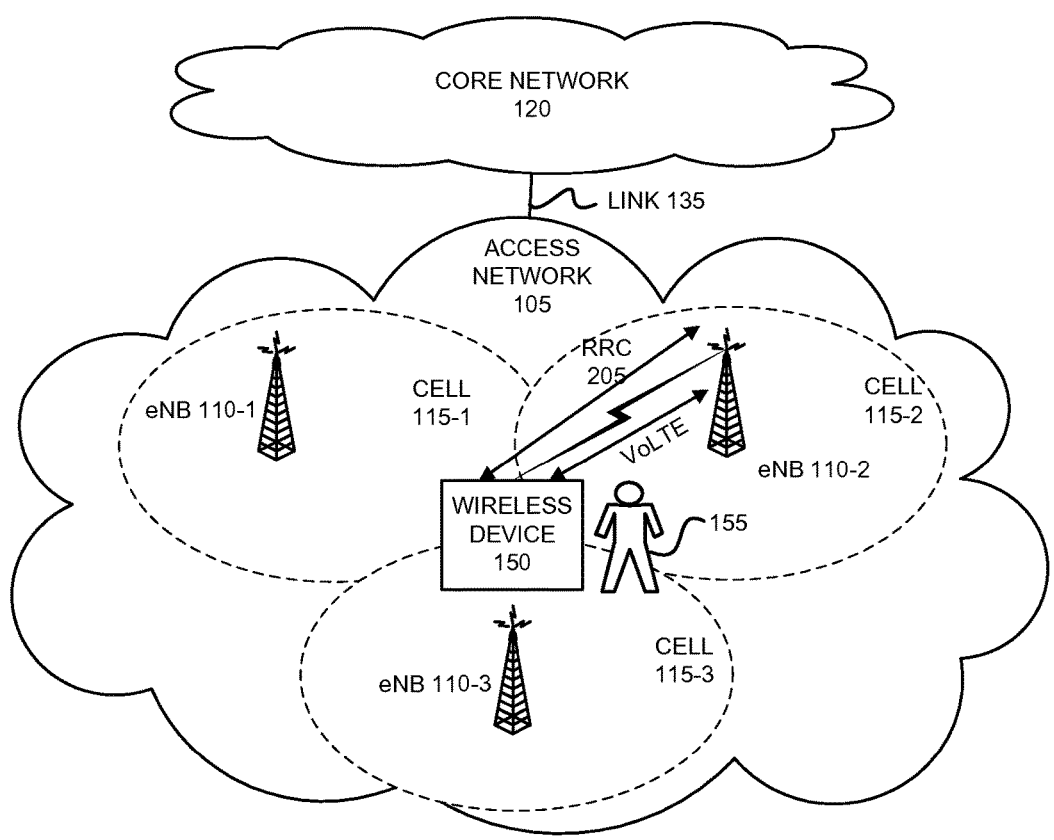

Referring to FIG. 2D, wireless device 150 receives and reads Master Information Block and System Information Block messages from eNB 110-2. Referring to FIG. 2E, wireless device 150 initiates a random access procedure with respect to eNB 110-2 in preparation for transmission of an RRC connection re-establishment request. Depending on the implementation, the random access procedure may be a contention-based RAP or a non-contention-based RAP. In either implementation, wireless device 150 and eNB 110-2 exchange messages in accordance with an LTE or an LTE-A random access procedure. Thereafter, wireless device 150 transmits an RRC connection re-establishment request to eNB 110-2. Upon receipt, eNB 110-2 transmits an RRC connection re-establishment accept message or an RRC connection re-establishment reject message to wireless device 150. According to this exemplary scenario, assume that eNB 110-2 transmits the RRC connection re-establishment accept message. Upon receipt, wireless device 150 transmits an RRC connection re-establishment complete message to eNB 110-2, which is subsequently received at eNB 110-2. As illustrated in FIG. 2F, upon completion of the RRC connection re-establishment procedure, an RRC connection 205 is established between wireless device 150 and eNB 110-2. Also, referring to FIG. 2F, the VoLTE call is not dropped and user 155 continues on the VoLTE call based on RRC 205 with eNB 110-2.

Although the above scenario has been explained with respect to a particular network (e.g., LTE or LTE-A), a particular triggering event (e.g., a radio link failure), a particular session (e.g., a telephone call), according to other embodiments, the extended cell selection process may be applied to different types of networks (e.g., a Third Generation network, such as a Universal Mobile Telecommunications Service (UMTS) network, etc.), in response to a different type of triggering event, a different type of session (e.g., a non-real-time session), and/or when a session does not exist.

Figure 3:
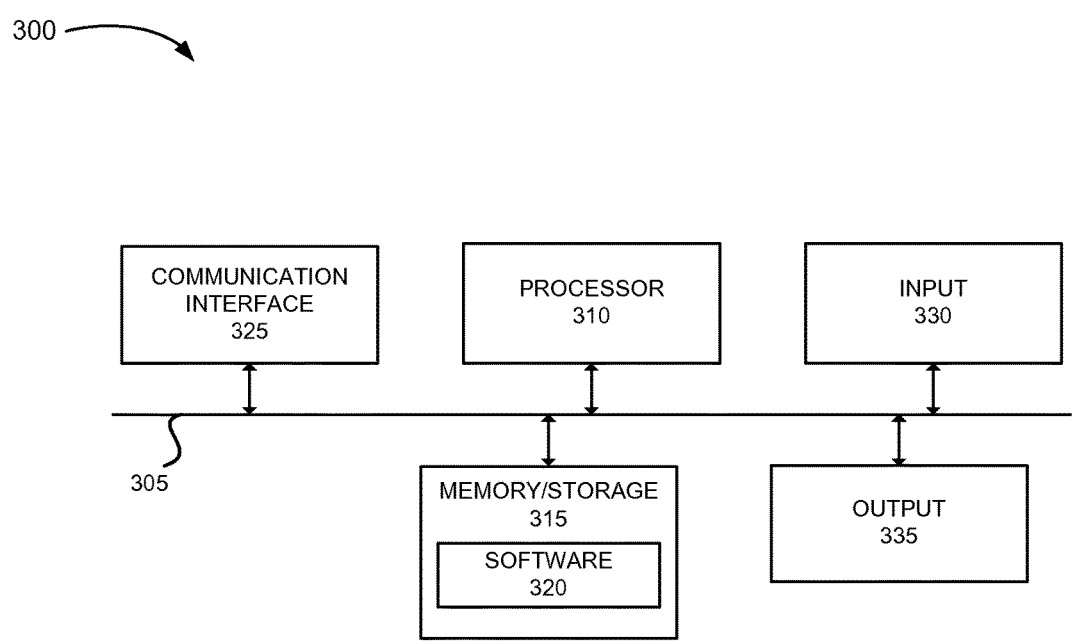
FIG. 3 is a diagram illustrating exemplary components of a device that may correspond to one or more of the devices in the exemplary environment.

FIG. 3 is a diagram illustrating exemplary components of a device 300. Device 300 may correspond to eNB 110 and wireless device 150 depicted in environment 100. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, wireless device 150 may include software 320 pertaining to the extended cell selection service, as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, modulating, de-modulating, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
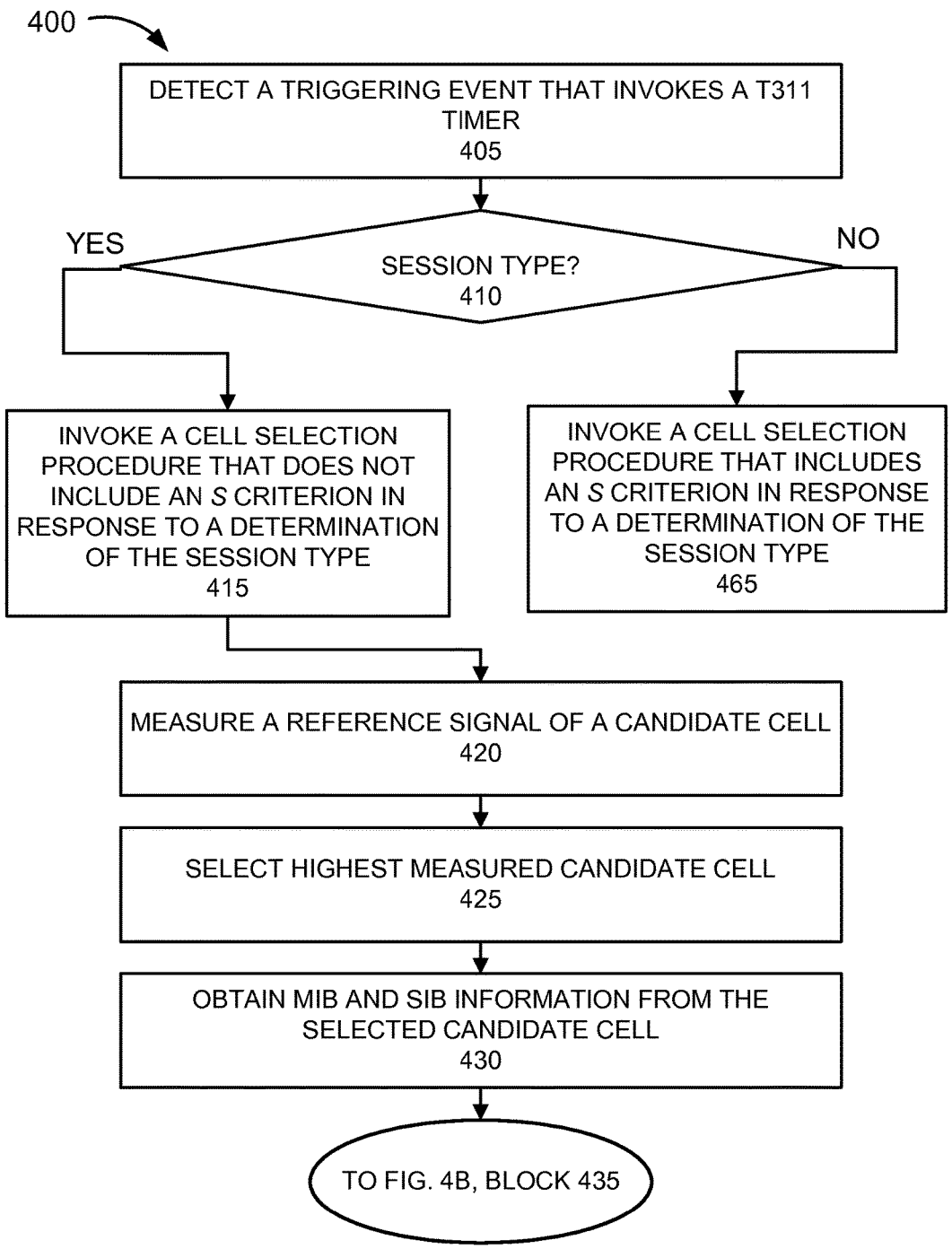
FIGS. 4A and 4B are flow diagrams that illustrate an exemplary process pertaining to the extended cell selection service.
Figure 4B:
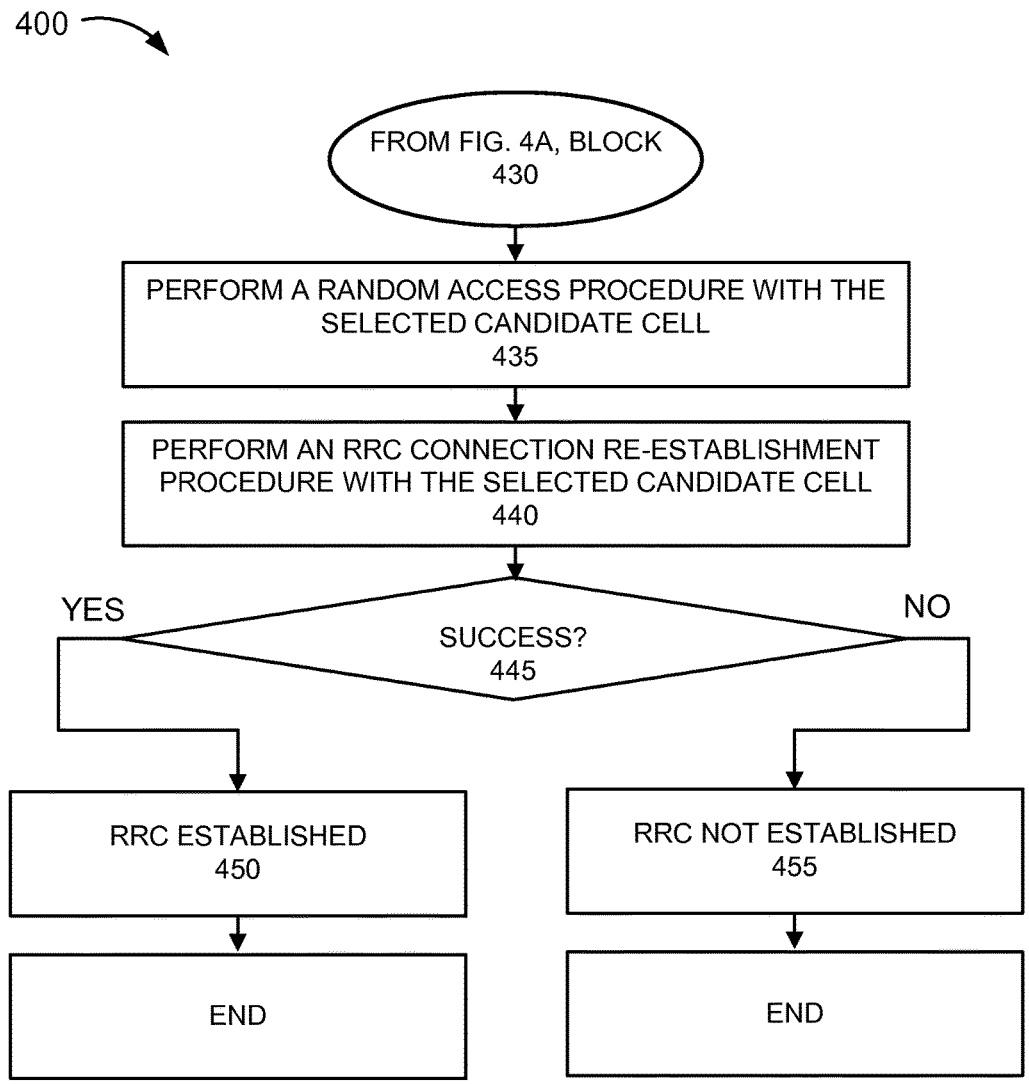

FIGS. 4A and 4B are flow diagrams illustrating an exemplary process 400 pertaining to the extended cell selection service. Process 400 is directed to a process previously described above with respect to FIGS. 2A-2F and elsewhere in this description, in which a wireless device, when in an RRC connected state, invokes an extended cell selection service that does not include the use of the cell selection S criterion. According to an exemplary embodiment, wireless device 150 performs the steps described in process 400. For example, processor 305 may execute software 315 to perform the steps described in process 400. By way of further example, a modem of wireless device 150 may include logic that performs some or all of the steps of process 400. Additionally, it may be assumed that once wireless device 150 starts the T311 timer, wireless device 150 is continuously monitoring the T311 timer. Additionally, wireless device 150 may start, stop, and monitor other timers (e.g., a T301 timer) according to 3GPP specification.

Referring to FIG. 4A, process 400 begins with detecting a triggering event that will invoke a T311 timer. For example, wireless 150 may detect various types of events that, when in the RRC connected state, invokes an extended cell selection process and triggers the T311 timer. For example, the triggering event may be a radio link failure, a handover failure, an RRC connection reconfiguration failure, a physical layer problem (e.g., wireless devices 150 receives N310 consecutive out-of-sync indications from a lower layer) and a T310 timer expires, a mobility from EURTA command failure and a T304 timer expires, or another type of triggering event that may be proprietary in nature (e.g., not in accordance with the 3GPP specification for LTE).

In block 410, a type of session is determined. For example, wireless device 150 may determine whether a user session exists. Additionally, or alternatively, when a user session exists, wireless device 150 may determine whether the session is a real-time session or a non-real-time session. Additionally, or alternatively, when a user session exists, wireless device 150 may determine whether a particular type of user session exists. By way of example, wireless device 150 may determine whether a voice session (e.g., a VoLTE session) exists. Wireless device 150 may make such determinations based on the type of application currently running on wireless device 150, the existence of a dedicated bearer (e.g., a QCI dedicated bearer for VoLTE media flow), and so forth.

When the type of session that is determined corresponds to the type of session to invoke an extended cell selection procedure that does not use the S criterion (block 410—YES), the extended cell selection procedure that does not use the S criterion is invoked (block 415). By way of example, when wireless device 150 determines that a voice session (e.g., a VoLTE session) exists, wireless device 150 invokes the extended cell selection procedure, as described herein. The extended cell selection procedure may include performing the following steps, subsequent to the starting of the T311 timer, as described in relation to the subsequent blocks illustrated in FIGS. 4A and 4B.

In block 420, a reference signal of a candidate cell is measured. For example, wireless device 150 may measure a reference signal pertaining to one or multiple candidate cells 115. Wireless device 150 may calculate a value. According to some exemplary implementations, wireless device 150 may search and scan based on a list, as previously described. Additionally, the candidate cell may include the cell on which the UE was camped. Wireless device 150 may store one or multiple values (e.g., an RSRP value, an RSSI value, an RSRQ value) for each candidate cell 115 that has been measured.

In block 425, the highest measured candidate cell is selected. For example, when multiple candidate cells are measured, wireless device 150 may compare the stored values to one another. Based on a result of the comparison, wireless device 150 selects the highest value from among the candidate cells 115. When only a single candidate cell 115 is measured and perhaps available, wireless device 150 selects that candidate cell 115.

In block 430, MIB and SIB information is obtained from the selected, candidate cell. For example, wireless device 150 receives MIB and SIB message transmitted by eNB 110, which corresponds to the selected, candidate cell 115. Wireless device 150 reads and decodes the MIB and SIB information carried by the MIB and SIB messages.

Referring to FIG. 4B, in block 435, a random access procedure is performed in relation to the selected, candidate cell. For example, wireless device 150 performs a contention-based RAP or a non-contention-based RAP. By way of example, during the contention-based RAP, wireless device 150 may transmit an RRC random access preamble. Upon receiving the RRC random access preamble, eNB 110 transmits an RRC random access response. According to another exemplary implementation, during the non-contention-based RAP, eNB 110 may transmit a random access preamble assignment message. Upon receiving this message, wireless device 150 may transmit an RRC random access preamble and a random access response. It may be assumed that the random access procedure is successful.

In block 440, an RRC connection re-establishment procedure with the selected, candidate cell is performed. For example, wireless device 150 transmits an RRC connection re-establishment request to eNB 110. Upon receipt, eNB 110 may transmit an RRC connection re-establishment accept message or an RRC connection re-establishment reject message to wireless device 150. Wireless device 150 receives one of these messages.

In block 445, it is determined whether the RRC connection re-establishment was successful. When the message from eNB 110 is the RRC connection re-establishment accept message (block 440—YES), wireless device 150 determines that the RRC connection re-establishment was successful (block 450). Wireless device 150 may transmit an RRC connection re-establishment complete message to eNB 110. An RRC connection is established between wireless device 150 and eNB 110.

When the message from eNB 110 is the RRC connection re-establishment reject message (block 445—NO), wireless device 150 determines that the RRC connection re-establishment was not successful (block 455). For example, process 400 may end and wireless device 150 enters an RRC idle mode according to 3GPP procedure. According to such an exemplary scenario, the VoLTE call may or may not be dropped.

Referring back to FIG. 4A, when the type of session that is determined corresponds to the type of session to invoke a cell selection procedure that does use the S criterion (block 410—NO), the cell selection procedure that does use the S criterion is invoked (block 465). By way of example, when wireless device 150 determines that a voice session (e.g., a VoLTE session) does not exist, wireless device 150 invokes a cell selection procedure that uses the S criterion. For example, wireless device 150 invokes a cell selection procedure set forth in a 3GPP LTE standard.

Although FIGS. 4A and 4B illustrate an exemplary extended cell selection process 400, according to other embodiments, process 400 may include additional operations, fewer operations, and/or different operations than those illustrated in FIGS. 4A and 4B, and described herein. For example, according to other exemplary embodiments, block 410 of process 400 may be omitted. That is, there is no additional condition to be satisfied, other than the detection of the triggering event, in order for wireless device 150 to invoke the extended cell selection procedure that does not use the S criterion associated with the RRC idle mode. Alternatively, as described herein, various conditions of whether a session exists, the type of session (e.g., real-time versus non-real-time), and so forth may be included as a step in process 400.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 315.

No element, act, or instruction described in the present application should be construed as critical or essential to the embodiments described herein unless explicitly described as such.

What is claimed is:

1. A method comprising:
   camping, by a wireless device associated with a user, on a cell of a wireless network, wherein the wireless device is in a Radio Resource Control (RRC) connected state relative to a wireless station of the wireless network, and wherein the wireless device is configured to perform a first extended cell selection procedure and a second extended cell selection procedure;
   detecting, by the wireless device, a triggering event that invokes a T311 timer, while the wireless device is in the RRC connected state;
   determining, by the wireless device, whether the wireless device is involved in a real-time session or a non-real-time session, as a binary choice, in response to the detecting;
   invoking, by the wireless device, the first extended cell selection procedure that does not use any minimum threshold value as a basis to select a candidate cell to re-establish an RRC connection, in response to determining that the wireless device is involved in the real-time session; and
   invoking, by the wireless device, the second extended cell selection procedure that uses an S criterion value as a basis to select a candidate cell to re-establish the RRC connection, in response to determining that the wireless device is involved in the non-real-time session.

2. The method of claim 1, wherein the triggering event is one of a radio link failure, a handover failure, a mobility from Evolved Universal Terrestrial Radio Access (E-UTRA) failure, an integrity check failure indication, or an RRC connection reconfiguration failure.

3. The method of claim 1, further comprising:
   determining, by the wireless device, whether the wireless device is involved in an active session in response to the detecting; and
   determining, by the wireless device, whether the wireless device is involved in the real-time session or the non-real-time session, as the binary choice, in response to determining that the wireless device is involved in the active session.

4. The method of claim 1, wherein the wireless network is a Long Term Evolution (LTE) network or an LTE-Advanced network, and the wireless station is an evolved Node B, and wherein the real-time session is a voice over LTE session.

5. The method of claim 1, wherein the second extended cell selection procedure comprises:
   measuring, by the wireless device, one or more reference signals pertaining to one or more candidate cells;
   calculating, by the wireless device, the S criterion value based on the measuring; and
   selecting, by the wireless device, one of the one or more candidate cells as a cell to re-establish the RRC connection based on the calculating.

6. The method of claim 1, wherein the first extended cell selection procedure comprises:
   measuring, by the wireless device, one or more reference signals pertaining to one or more candidate cells;
   determining, by the wireless device, which of the one or more candidate cells has at least one of a highest received signal strength or quality; and
   selecting, by the wireless device, one of the one or more candidate cells as a cell to re-establish the RRC connection based on the one of the one or more candidate cells having the at least one of the highest received signal strength or quality.

7. The method of claim 6, wherein the first extended cell selection procedure further comprises:
   performing, by the wireless device, a random access procedure, based on the selecting; and
   performing an RRC connection re-establishment procedure subsequent to the performing of the random access procedure.

8. The method of claim 6, wherein the first extended cell selection procedure further comprises:

receiving, by the wireless device, master information block and system information block messages from the one of the one or more candidate cells, based on the selecting.

9. A user device comprising:
a communication interface;
a memory, wherein the memory stores instructions; and
a processor, wherein the processor executes the instructions to:
    camp on a cell of a wireless network, wherein the user device is in a Radio Resource Control (RRC) connected state relative to a wireless station of the wireless network, and wherein the user device is configured to perform a first extended cell selection procedure and a second extended cell selection procedure;
    detect a triggering event that invokes a T311 timer, while the user device is in the RRC connected state;
    determine whether the user device is involved in a real-time session or a non-real-time session, as a binary choice, in response to the detection;
    invoke the first extended cell selection procedure that does not use any minimum threshold value as a basis to select a candidate cell to re-establish an RRC connection, in response to a determination that the user device is involved in the real-time session; and
    invoke the second extended cell selection procedure that uses an S criterion value as a basis to select a candidate cell to re-establish the RRC connection, in response to a determination that the user device is involved in the non-real-time session.

10. The user device of claim 9, wherein the triggering event is one of a radio link failure, a handover failure, a mobility from Evolved Universal Terrestrial Radio Access (E-UTRA) failure, an integrity check failure indication, or an RRC connection reconfiguration failure.

11. The user device of claim 9, wherein the processor further executes the instructions to:
    determine whether a user of the user device is involved in an active session in response to the detection; and
    determine whether the user device is involved in the real-time session or the non-real-time session, as the binary choice, in response to a determination that the user device is involved in the active session.

12. The user device of claim 9, wherein the wireless network is a Long Term Evolution (LTE) network or an LTE-Advanced network, and the wireless station is an evolved Node B, and wherein when invoking the first extended cell selection procedure, the processor further executes the instructions to:
    measure one or more reference signals pertaining to one or more candidate cells;
    store one or more measured values;
    determine which of the one or more candidate cells has at least one of a highest received signal strength or quality based on the one or more measured values; and
    select one of the one or more candidate cells as a cell to re-establish the RRC connection based on the one of the one or more candidate cells having the at least one of the highest received signal strength or quality.

13. The user device of claim 12, wherein the processor further executes the instructions to:
    perform a random access procedure in relation to the one of the one or more candidate cells; and
    perform an RRC connection re-establishment procedure subsequent to the random access procedure.

14. The user device of claim 13, wherein the processor further executes the instructions to:
    determine whether the RRC connection re-establishment procedure is successful; and
    enter an RRC idle mode in response to a determination that the RRC connection re-establishment procedure is not successful.

15. The user device of claim 9, wherein, when invoking the second extended cell selection procedure, the processor further executes the instructions to:
    measure one or more reference signals pertaining to one or more candidate cells;
    calculate the S criterion value based on the measurement; and
    select one of the one or more candidate cells as a cell to re-establish the RRC connection based on the calculation.

16. A non-transitory storage medium storing instructions executable by a processor of a device to:
    camp on a cell of a wireless network, wherein the device is in a Radio Resource Control (RRC) connected state relative to a wireless station of the wireless network, and wherein the device is configured to perform a first extended cell selection procedure and a second extended cell selection procedure;
    detect a triggering event that invokes a T311 timer, while the device is in the RRC connected state;
    determine whether the device is involved in a real-time session or a non-real-time session, as a binary choice, in response to the detection;
    invoke the first extended cell selection procedure that does not use any minimum threshold value as a basis to select a candidate cell to re-establish an RRC connection, in response to a determination that the device is involved in the real-time session; and
    invoke the second extended cell selection procedure that uses an S criterion value as a basis to select a candidate cell to re-establish the RRC connection, in response to a determination that the user device is involved in the non-real-time session.

17. The non-transitory storage medium of claim 16, wherein the instructions further comprise instructions to:
    determine whether a user of the device is involved in an active session in response to the detection; and
    determine whether the user device is involved in the real-time session or the non-real-time session, as the binary choice, in response to a determination that the user device is involved in the active session.

18. The non-transitory storage medium of claim 16, wherein the instructions to invoke the first extended cell selection procedure further comprise instructions to:
    measure one or more reference signals pertaining to one or more candidate cells;
    store one or more measured values;
    determine which of the one or more candidate cells has at least one of a highest received signal strength or quality based on the one or more measured values; and
    select one of the one or more candidate cells as a cell to re-establish the RRC connection based on the one of the one or more candidate cells having the at least one of the highest received signal strength or quality.

19. The non-transitory storage medium of claim 18, wherein the instructions to invoke further comprise instructions to:
    perform a random access procedure in relation to the one of the one or more candidate cells; and perform an RRC connection re-establishment procedure subsequent to the random access procedure.

20. The non-transitory storage medium of claim 16, wherein the instructions to invoke the second extended cell selection procedure further comprise instructions to:
  measure one or more reference signals pertaining to one or more candidate cells;
  calculate the S criterion value based on the measurement; and
  select one of the one or more candidate cells as a cell to re-establish the RRC connection based on the calculation.

* * * * *